(12) United States Patent
Kwak et al.

(10) Patent No.: US 7,931,980 B2
(45) Date of Patent: Apr. 26, 2011

(54) ELECTRODE ASSEMBLY AND RECHARGEABLE BATTERY USING THE SAME

(75) Inventors: Yoon Tai Kwak, Cheonan-si (KR); Eui Sun Hong, Cheonan-si (KR); Soo Yeon Maeng, Incheonkwangyok-si (KR); Hoon Yim, Asan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1201 days.

(21) Appl. No.: 11/165,320

(22) Filed: Jun. 24, 2005

(65) Prior Publication Data

US 2006/0051662 A1 Mar. 9, 2006

(30) Foreign Application Priority Data

Jun. 25, 2004 (KR) .................. 10-2004-0048000

(51) Int. Cl.
*H01M 2/18* (2006.01)
*H01M 2/16* (2006.01)
*H01M 4/00* (2006.01)

(52) U.S. Cl. .......... 429/142; 429/130; 429/94; 429/246
(58) Field of Classification Search .............. 429/94, 429/129–130, 137, 142, 246
See application file for complete search history.

(56) References Cited

U.S. PATENT DOCUMENTS

| 6,287,720 | B1 * | 9/2001 | Yamashita et al. | 429/131 |
| 6,682,853 | B2 * | 1/2004 | Kimijima et al. | 429/246 |
| 2001/0033962 | A1 * | 10/2001 | Suzuki | 429/94 |
| 2004/0096735 | A1 * | 5/2004 | Komatsu et al. | 429/176 |
| 2004/0202928 | A1 * | 10/2004 | Miyamoto et al. | 429/137 |

FOREIGN PATENT DOCUMENTS

| JP | 10-241737 | | 9/1998 |
| JP | 10-326629 | | 12/1998 |
| JP | 2000-173657 | | 6/2000 |
| JP | 2001-155779 | | 6/2001 |
| JP | 2001155779 | A * | 6/2001 |
| JP | 2003-59540 | | 2/2003 |
| KR | 2003042578 | A * | 6/2003 |

* cited by examiner

*Primary Examiner* — Dah-Wei D Yuan
*Assistant Examiner* — Edu E Enin-Okut
(74) *Attorney, Agent, or Firm* — H.C. Park & Associates, PLC

(57) ABSTRACT

An electrode assembly is adapted to prevent the separator from contracting due to heat that is generated near the electrode tab during overcharging, over-discharging, or in the case of an internal short circuit. The electrode assembly also prevents an additional short circuit between the electrode plates. A rechargeable battery that comprises the electrode assembly is also provided. The present invention prevents the electrode tab from being short-circuited due to increased heat generation during overcharging or in the case of a short circuit, thus improving the safety of the rechargeable battery.

23 Claims, 8 Drawing Sheets

_US 7,931,980 B2_

ELECTRODE ASSEMBLY AND RECHARGEABLE BATTERY USING THE SAME

CROSS REFERENCE TO RELATED APPLICATION

This application claims priority to and the benefit of Korean Patent Application No. 2004-0048000, filed on Jun. 25, 2004, which is hereby incorporated by reference for all purposes as if fully set forth herein.

BACKGROUND OF THE INVENTION

1. Field of the Invention

The present invention relates to a rechargeable lithium ion battery. In particular, the present invention relates to an electrode assembly that prevents the separator from contracting due to heat that is generated near the electrode tab during overcharging or over-discharging, or in the case of an internal short circuit. The present invention also prevents additional short circuits from occurring between the electrode plates. The invention also relates to a rechargeable battery that uses the electrode assembly.

2. Description of the Prior Art

A rechargeable battery refers to a battery that can be repeatedly charged and discharged, in contrast to a non-rechargeable battery that cannot be recharged. Rechargeable batteries are widely used in cutting-edge electronic devices including portable telephones, laptop computers, and camcorders.

For example, lithium ion rechargeable batteries have an operating voltage of 3.7 V, which is three times larger than that of nickel-cadmium batteries or nickel-hydrogen batteries which are often used in portable electronic devices. The lithium ion rechargeable batteries also have a high energy density per unit weight which makes them suitable for use in the industry.

Lithium ion rechargeable batteries usually use a lithium-based oxide as the positive electrode active material and a carbon material as the negative electrode active material. Lithium ion rechargeable batteries are generally classified according to the type of electrolyte used such as liquid electrolyte and polymer electrolyte. Batteries that use a liquid electrolyte are referred to as lithium ion batteries and batteries that use a polymer electrolyte are referred to as lithium polymer batteries. Lithium ion rechargeable batteries are manufactured in various shapes including cylinder-type, can-type, and pouch-type batteries.

A can-type lithium ion rechargeable battery, as shown in FIG. 1 and FIG. 2 includes a can 10, an electrode assembly 20 contained in the can 10, and a cap assembly 70 that seals the opening of the can 10.

The can 10 may be made of metal and may be in the shape of a rectangular box. Thus, the can may itself serve as a terminal of the battery. The can 10 has an opening that is formed on one of its surfaces such as a top opening 10a, through which the electrode assembly 20 is placed into the can 10.

The electrode assembly 20 includes a positive electrode plate 30, a negative electrode plate 40, and a separator 50. The positive electrode plate 30 and negative electrode plate 40 are laminated with the separator 50 that is interposed in between them and are wound into a jelly roll.

The positive electrode plate 30 includes a positive electrode collector 32 that is made up of thin aluminum foil and a positive electrode coated portion 34 that has a lithium-based oxide as its main component which is coated on both surfaces of the positive electrode collector 32. The positive electrode collector 32 also has a positive electrode uncoated portion 32a that has no positive electrode coating formed thereon and is positioned on both ends of the positive electrode plate 30. A positive electrode tab 36 is fixed to the positive electrode uncoated portion 32a by ultrasonic welding with both ends thereof being fixed to protrude from the upper end of the positive electrode collector 32. The positive electrode tab 36 usually comprises nickel or nickel alloy, but other metallic substances may also be used.

The negative electrode plate 40 includes a negative electrode collector 42 that is made of thin copper foil and a negative electrode coated portion 44 that mainly comprises a carbon material and which is formed on both surfaces of the negative electrode collector 42. The negative electrode collector 42 has a negative electrode uncoated portion 42a that has no negative electrode coating formed thereon and is positioned on both ends of the negative electrode plate 40. A negative electrode tab 46 is fixed to the negative electrode uncoated portion 42a by ultrasonic welding with both of its ends protruding from the upper end of the negative electrode collector 42. The negative electrode tab 46 usually comprises nickel or nickel alloy, but other metallic substances may also be used.

The separator 50 is positioned between the positive electrode plate 30 and negative electrode plate 40 to insulate them from each other. The separator 50 may comprise polyethylene, polypropylene, or a composite film of polyethylene and polypropylene, for example. The separator 50 may be wider than the positive electrode plate 30 and negative electrode plate 40 to prevent a short circuit between them.

The cap assembly 70 includes a cap plate 71, an insulation plate 72, a terminal plate 73, and a negative electrode terminal 74. After being coupled to a separate insulation case 79, the cap assembly 70 is coupled to the top opening 10a of the can 10 and seals it.

If a rechargeable battery is over-charged, over-discharged, or if a short circuit occurs between the electrodes, heat may be generated in the can. In particular, heat generation is concentrated on a part of the can that experiences increased internal resistance. This is the region where different kinds of metals are bonded to each other to weld the electrode plate to the electrode tab. Since heat generation is concentrated near the electrode tab, the separator that insulates the positive electrode plate and the negative electrode plate from each other may melt and contract. As shown by a dotted line 52 in FIG. 2, the end of the separator 50 that is positioned on the negative electrode tab 46 may severely contract and the insulation film between the positive electrode plate 30 and negative electrode plate 40 may disappear. As a result, an additional short circuit may occur between the positive electrode plate 30 and the negative electrode plate 40. When heat is generated in the rechargeable battery, the end of the separator 50 that is positioned on the positive electrode tab 36 may also contract.

As recently developed rechargeable batteries tend to have a larger power storage capacity, the energy density of these batteries also increases. This results in a higher occurrence is of over-heating and explosion of the rechargeable batteries.

SUMMARY OF THE INVENTION

The present invention provides an electrode assembly that prevents the separator from contracting due to exposure to heat that is generated near the electrode tab during overcharging, over-discharging, or due to an internal short circuit. The present invention also prevents additional short circuits from occurring between the electrode tabs and the electrode plates.

The present invention also provides a rechargeable battery using the electrode assembly.

Additional features of the invention will be set forth in the description which follows, and in part will be apparent from the description, or may be learned by practice of the invention.

The present invention discloses a rechargeable battery including an electrode assembly that is formed by winding together a first electrode plate, a second electrode plate, and a separator. The first electrode plate comprises a first electrode collector, a first electrode coated portion, and a first electrode uncoated portion that is formed on at least one side thereof. The second electrode plate comprises a second electrode collector, a second electrode coated portion, and a second electrode uncoated portion that is formed on at least one side thereof. The separator insulates the first electrode plate and second electrode plate from each other and has the first electrode tab and the second electrode tab fixed to the first electrode uncoated portion and second electrode uncoated portion on a side of the first electrode plate and second electrode is plate, respectively. In addition, an insulation tape is attached to the separator in a position facing the first electrode plate or the second electrode plate when the first electrode plate and second electrode plate and the separator are wound.

The present invention also discloses an electrode assembly for a rechargeable battery comprising a first electrode plate comprising a first electrode collector, a first electrode coated portion, and a first electrode tab that is welded to a first electrode uncoated portion on a side thereof. The electrode assembly further comprises a second electrode plate comprising a second electrode collector, a second electrode coated portion, and a second electrode tab that is welded to a second electrode uncoated portion on a side thereof. In addition, a separator is wound together with the first electrode plate and second electrode plate to insulate them from each other. An insulation tape is attached to the separator in a position facing the first electrode plate or the second electrode plate when the first electrode plate and second electrode plate and the separator are wound together.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
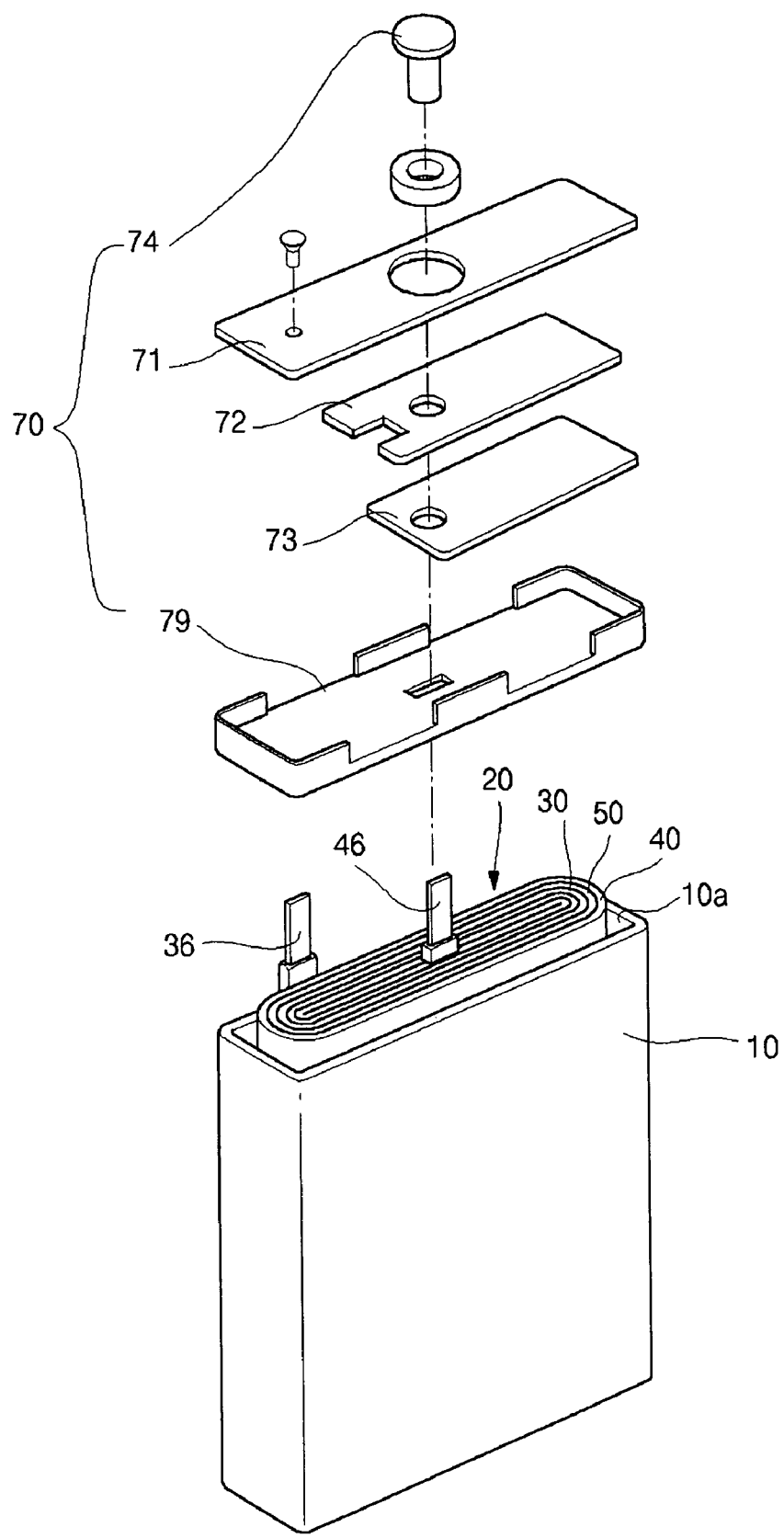
FIG. 1 is an exploded perspective view of a conventional rechargeable battery.
Figure 2:
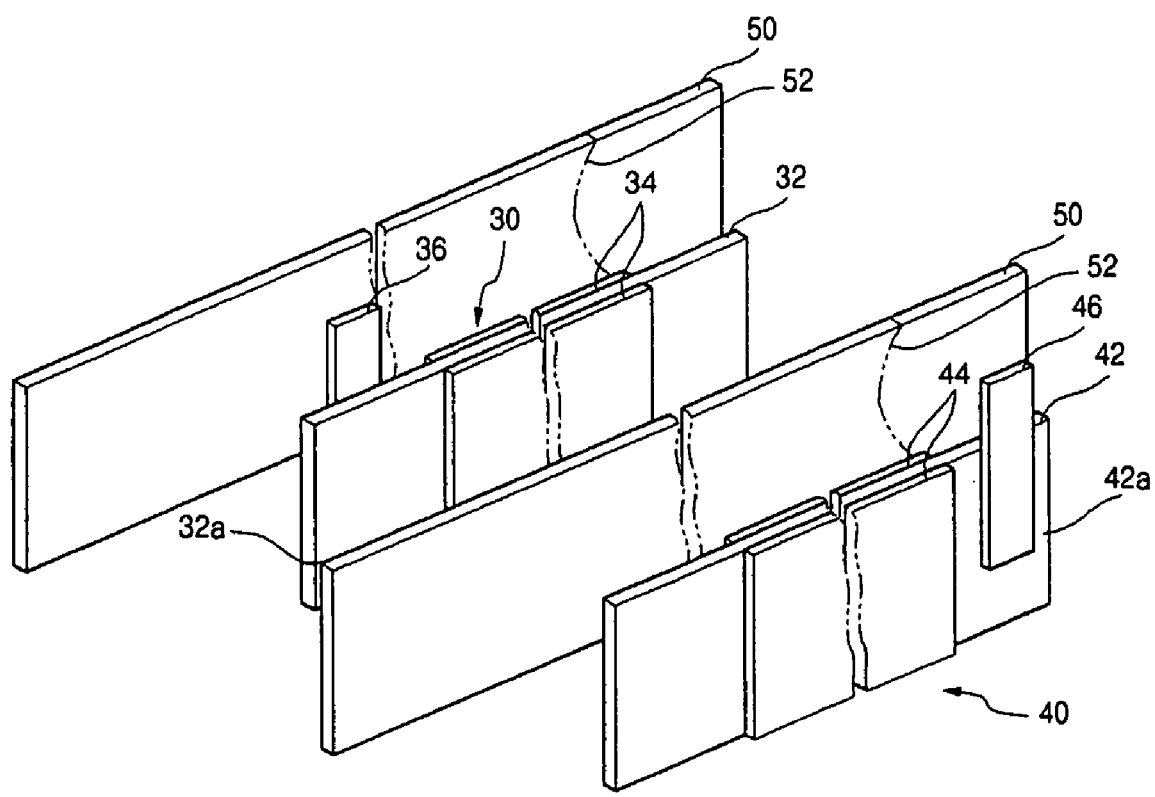
FIG. 2 is a perspective view of a conventional electrode assembly prior to winding.

The present invention prevents the separator from melting and contracting due to exposure to heat that may be generated at the electrode tab during overcharging, over-discharging, or in the case of a short circuit between the electrodes. The present invention also prevents an additional short circuit from occurring between the electrode tab and the electrode plate.

In addition, the present invention avoids any short circuit that may occur between the electrode plates that is caused by heat that is generated near the electrode tab due to higher power capacity of recent rechargeable batteries. Therefore, heating and explosion of the rechargeable batteries may be prevented, thus improving the safety of the battery.

Hereinafter, exemplary embodiments of the present invention will be described with reference to the accompanying drawings. In the following description and drawings, the same reference numerals are used to designate the same or similar components, so repetitious description of the same or similar components will be omitted.

Figure 3:
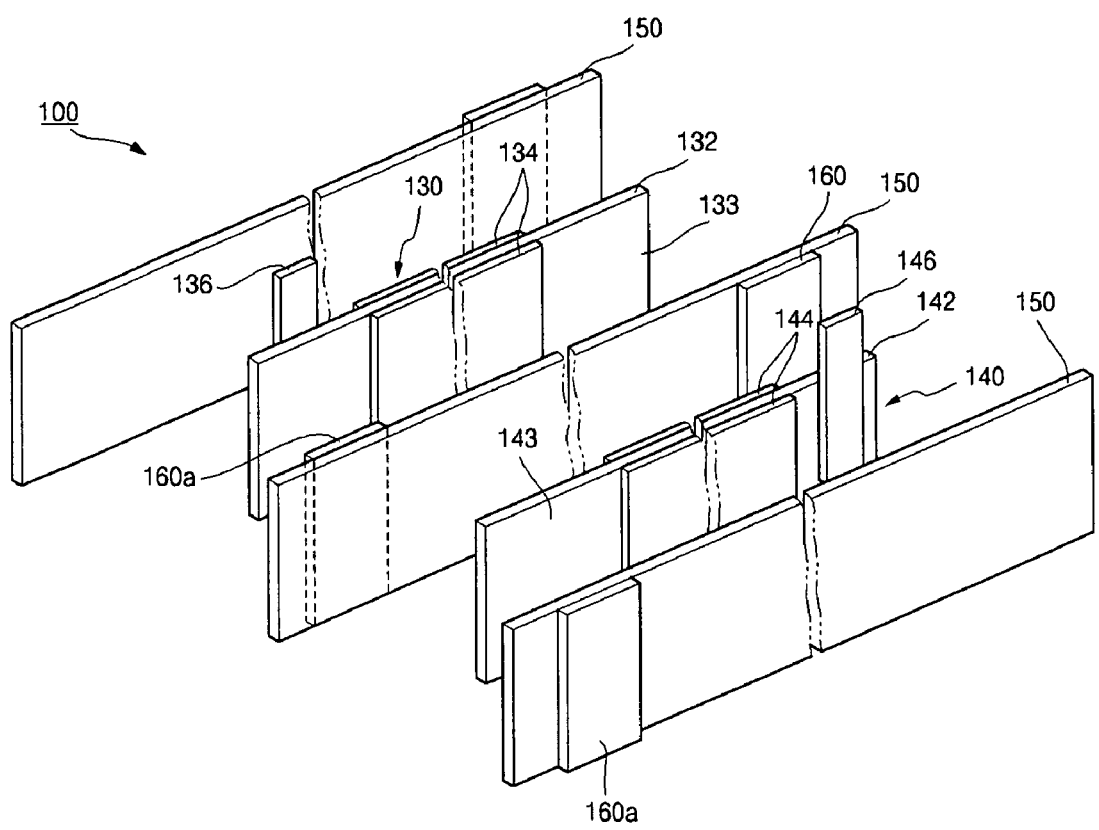
FIG. 3 is a perspective view of an electrode assembly, prior to winding according to an exemplary embodiment of the present invention.
Figure 4:
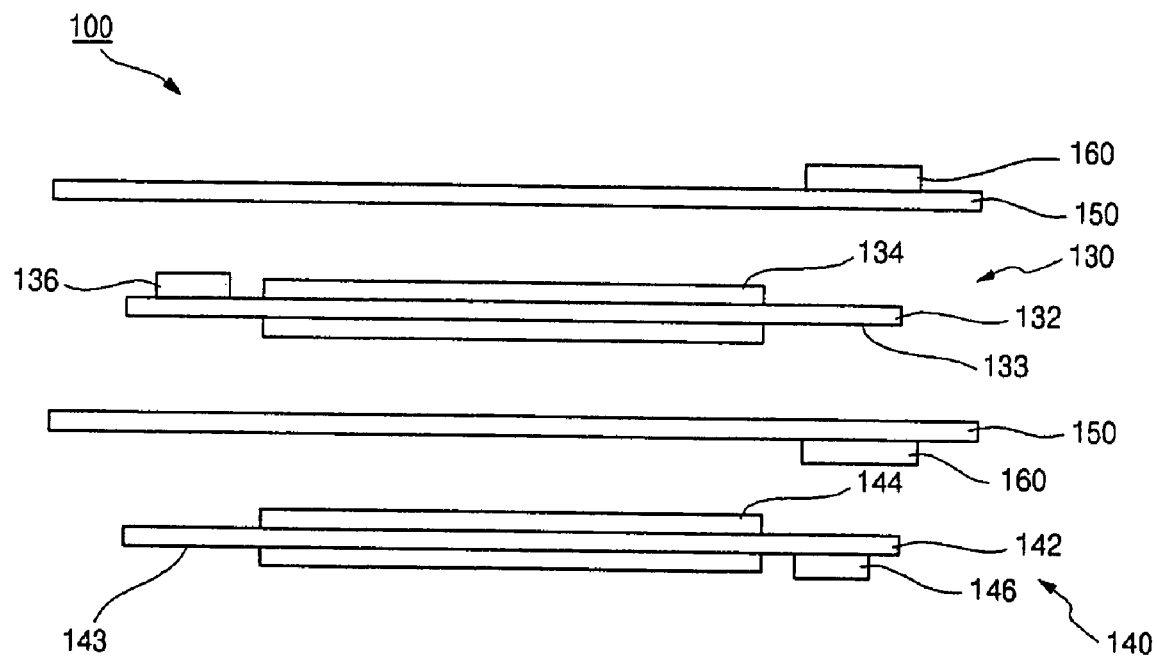
FIG. 4 is a top view of the electrode assembly shown in FIG. 3.
Figure 5:
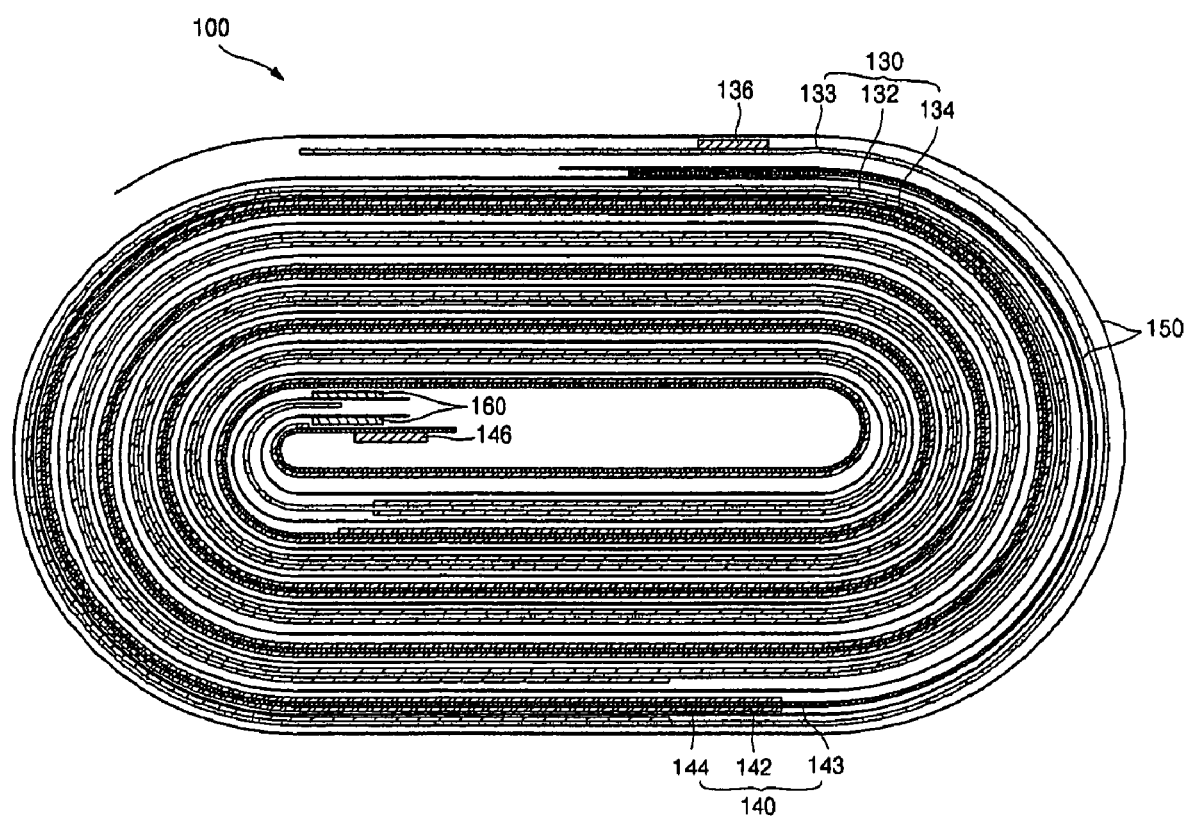
FIG. 5 is a top view of the electrode assembly shown in FIG. 3, after winding.
Figure 6:
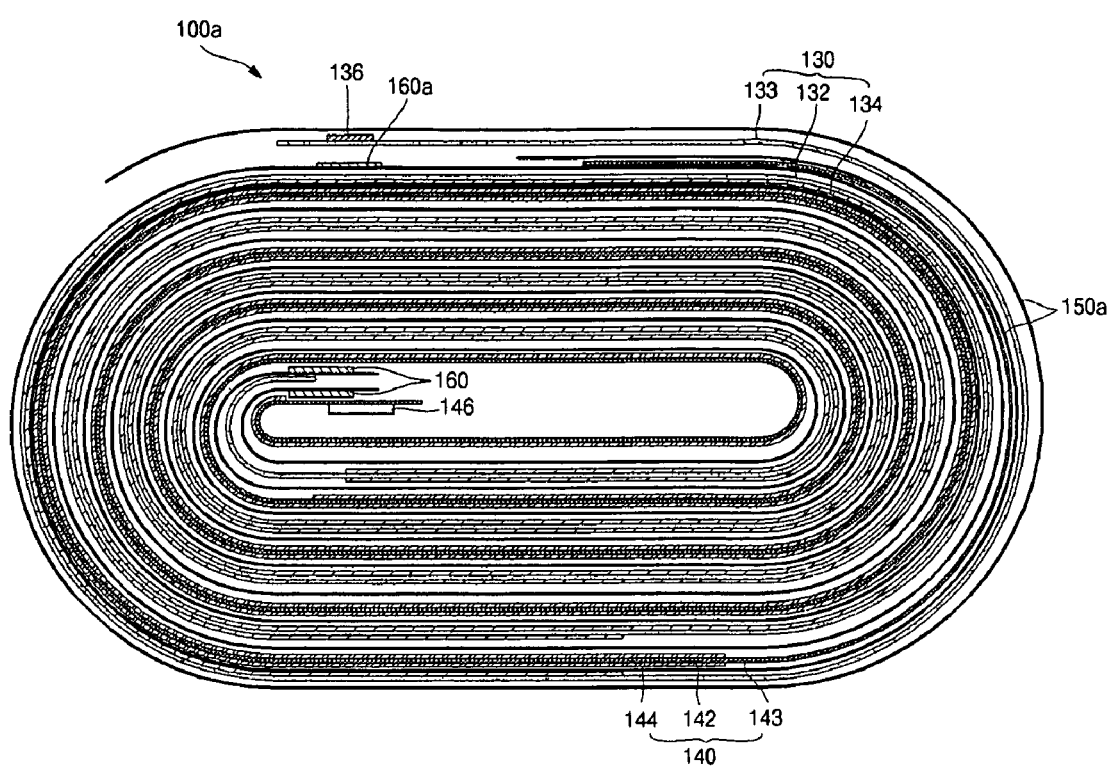
FIG. 6 is a top view of an electrode assembly after winding, according to another exemplary embodiment of the present invention.
Figure 7:
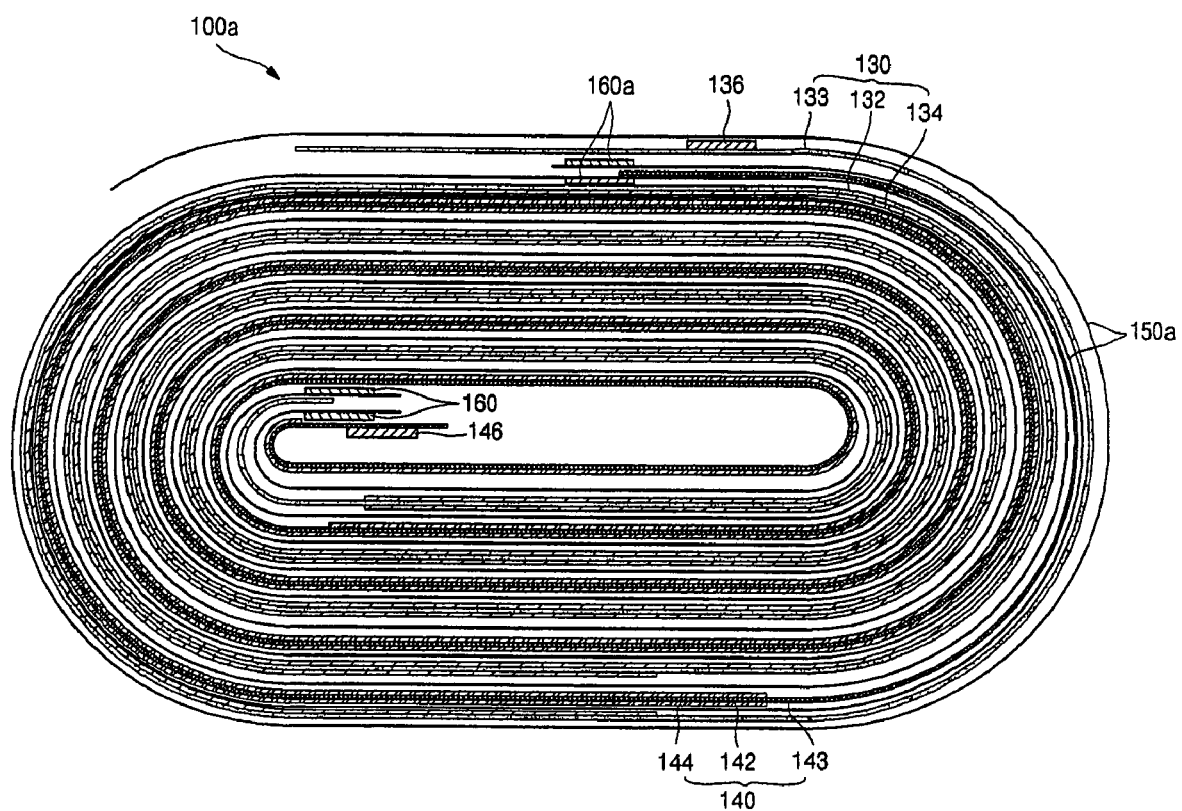
FIG. 7 is a top view of an electrode assembly after winding, according to another exemplary embodiment of the present invention.
Figure 8:
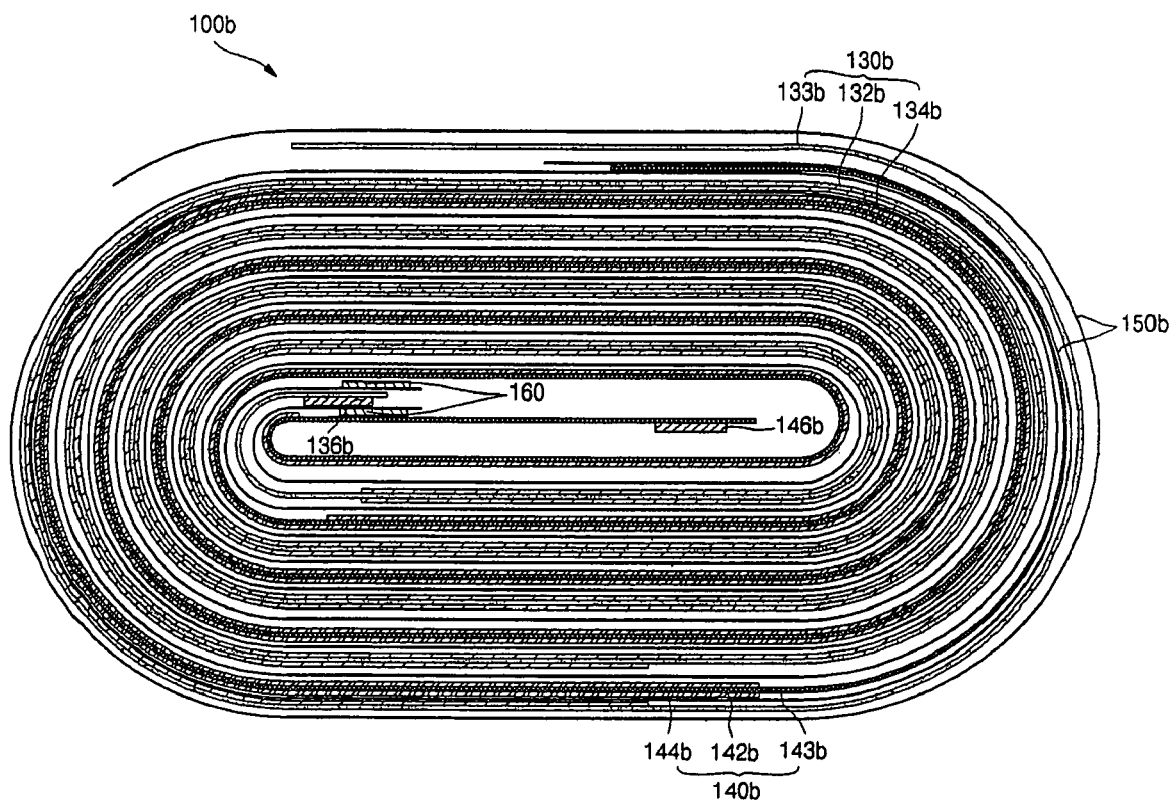
FIG. 8 is a top view of an electrode assembly after winding, according to another exemplary embodiment of the present invention.

FIG. 3 is a perspective view of an electrode assembly, prior to winding, according to a preferred embodiment of the present invention. FIG. 4 is a top view of the electrode assembly shown in FIG. 3. FIG. 5 is a top view of the electrode assembly shown in FIG. 3, after winding. FIG. 6 is a top view of a wound electrode assembly according to another exemplary embodiment of the present invention. FIG. 7 is a top view of a wound electrode assembly according to another exemplary embodiment of the present invention. FIG. 8 is a top view of a wound electrode assembly according to another exemplary embodiment of the present invention.

The electrode assembly 100, referring to FIG. 3, FIG. 4, and FIG. 5, includes a second electrode plate 130, a first electrode plate 140, and a separator 150. The second electrode plate 130 and first electrode plate 140 are laminated with the separator 150 interposed between them for insulation and are wound into a jelly roll. The electrode assembly 100 also includes an insulation tape 160 that is attached to the separator 150 in a predetermined position. The first electrode plate 140 and second electrode plate 130 may be formed as the negative electrode plate and the positive electrode plate, respectively.

The electrode assembly 100 comprises a first electrode tab 146 that is formed on the inner peripheral part thereof, is welded to the first electrode plate 140, and protrudes from the top of the electrode assembly 100. The electrode assembly 100 also comprises a second electrode tab 136 that is formed on the outer peripheral part thereof, is welded to the second electrode plate 130, and protrudes from the top of the electrode assembly 100. As used herein, the "inner peripheral part" refers to the central part around which the electrode assembly 100 is wound, while the "outer peripheral part" refers to the external side of the electrode assembly 100 which is opposite to the inner peripheral part. The position of the first electrode tab 146 and second electrode tab 136 may be switched and all of the first electrode tab 146 and second electrode tab 136 may be formed on the inner peripheral part.

The second electrode plate 130 includes a second electrode collector 132 and a second electrode coated portion 134. The second electrode collector 132 may comprise thin aluminum foil, for example. The second electrode coated portion 134 may have lithium-based oxide as its main component and is formed on both surfaces of the second electrode collector 132. The second electrode collector 132 has a second electrode uncoated portion 133 which has no second electrode coated portion 134 formed thereon, and is positioned in a predetermined region on at least one end thereof. The second electrode tab 136 is fixed to the second electrode uncoated portion 133, which is positioned on one end of the second electrode uncoated portion 133 by ultrasonic welding or laser welding. The second electrode tab 136 may comprise nickel metal and is fixed in such a manner that its upper end protrudes from the upper end of the second electrode collector 132.

The first electrode plate 140 comprises a first electrode collector 142 and a first electrode coated portion 144. The first electrode collector 142 may comprise thin copper foil, for example. The first electrode coated portion 144 may mainly comprise a carbon material and is formed on both surfaces of the first electrode collector 142. The first electrode collector 142 has a first electrode uncoated portion 143, which has no first electrode coated portion 144 formed thereon and is positioned on at least one end thereof. The first electrode tab 146 may comprise nickel metal and is ultrasonically welded to one of the first electrode uncoated portions 143 on either end of the first electrode collector 142, which is positioned on the inner peripheral part during winding. The first electrode tab 146 is fixed in such a manner that its upper end protrudes from the upper end of the first electrode collector 142.

The separator 150, referring to FIG. 5, is interposed between the second electrode plate 130 and first electrode plate 140 in the electrode assembly 100 to insulate them from each other and is wound together with them. The separator 150 has an insulation tape 160 that is attached to it in a predetermined position so that it faces the second electrode plate 130 or first electrode plate 140 when the second electrode plate 130 and first electrode plate 140 and the separator 150 are wound.

The insulation tape 160 prevents the heat that is generated from the first electrode tab 146 portion from being directly transferred to the separator 150. In particular, the insulation tape 160 effectively prevents the separator 150 from contracting in a position corresponding to the position of the first electrode tab 146, in spite of the heat generation at the first electrode tab 146. For that reason, the insulation tape 160 may be coupled with the separator in a position facing the first electrode plate uncoated portion corresponding to the position of the first electrode tab.

The insulation tape 160 has a predetermined width and the same height as the second electrode 130 or first electrode plate 140 and is attached to a surface of the separator 150 that does not contact the second electrode plate 130. The insulation tape 160 is sufficiently wide to be attached to the separator 150 in a position corresponding to the second electrode uncoated portion 133 of the second electrode plate 130. The insulation tape 160 is attached to a predetermined portion of the separator 150 and holds the separator 150 in place even when it is subjected to heat which prevents it from contracting.

FIG. 6 is a top view of a wound electrode assembly according to another exemplary embodiment of the present invention.

As shown in FIG. 6, the insulation tape 160a may be attached to a surface of at least one separator 150 in a position corresponding the second electrode uncoated portion 133 or an end of the second electrode coated portion 134 of the second electrode plate 130. The insulation tape 160a may be positioned on the inner peripheral part of the electrode assembly 100 when the first electrode plate 140, the second electrode plate 130, and the separator 150 are wound together to form the electrode assembly 100. Since a pair of separators 150 are interposed between both surfaces of the second electrode plate 130 and are then wound, the insulation tape 160a is attached to a surface of each separator 150.

The insulation tape 160 may be attached to a surface of the separator 150 that does not contact or a surface that does contact the second electrode uncoated portion 133 of the second electrode plate 130. When the insulation tape 160 is attached to the separator 150 in a position corresponding to an end of the second electrode coated portion 134 of the second electrode plate 130, the insulation tape 160 prevents the separator 150 from being damaged by a protrusion on the end of the second electrode coated portion 134.

The insulation tape 160 may be attached to a surface of at least one separator 150 in a position corresponding to the second electrode uncoated portion 133 of the second electrode plate 130 that is positioned on the inner peripheral part of the electrode assembly 100. The position of the second electrode uncoated portion 133 of the second electrode plate 130 generally corresponds to the first electrode tab 146 that is positioned on the inner peripheral part of the electrode assembly 100.

Accordingly, the insulation tape 160 may be attached to the separator 150 in a position corresponding to an end of the second electrode uncoated portion 133 of the second electrode plate 130 positioned on the inner peripheral part of the electrode assembly 100. When the separator 150 contracts due to exposure to heat, its end contracts first. The end of the second electrode uncoated portion 133 of the second electrode plate 130 is then exposed and may be short-circuited to the first electrode plate 140. Therefore, the insulation tape 160 is preferably attached to the separator 150 in a position corresponding to an end of the second electrode uncoated portion 133 of the second electrode plate 130. More preferably, the insulation tape 160 is attached to the separator 150 so that the end of the second electrode uncoated portion 133 of the second electrode plate 130 is positioned at the center of the width of the insulation tape 160.

The insulation tape 160 may be attached to at least one separator 150 in a region where separators 150 contact each other outside the end of the second electrode plate 130 that is positioned on the inner peripheral part of the electrode assembly 100. More specifically, when the separator 150 elongates well beyond the second electrode uncoated portion 133 of the second electrode plate 130, the insulation tape 160 may be attached to an end of the separator 150. In this case, the insulation tape 160 is attached to an end of the separator 150 that is outside the end of the second electrode plate 130 so that it prevents the end of the separator 150 from contracting.

In general, a large amount of heat is generated in the electrode assembly 100 at a welded portion between the first electrode plate 140 or second electrode plate 130 and the first electrode tab 146 or the second electrode tab 136, respectively. In particular, the largest amount of heat is generated in the electrode assembly 100 from a welded portion between the first electrode plate 140 and the first electrode tab 146. As a result, the separator 150 that is wound to the inner peripheral part of the electrode assembly 100 contracts severely. However, since an insulation tape 160 that exhibits little change depending on temperature is attached to a surface of the separator 150, the separator 150 is prevented from contracting even when heat is generated from the inner peripheral part of the electrode assembly 100, particularly from the first electrode tab 146 which is positioned adjacent to the separator 150. Consequently, the first electrode plate 140 and second electrode plate 130 are prevented from being short-circuited to each other.

The insulation tape 160 is made up of a material that does not interact with the electrolyte that is used in the rechargeable battery and that has sufficient resistance to heat deformation (e.g., contract) at a temperature of 150° C. or above. Such materials may include, but are not limited to polyphenylene sulfide, polyimide, and polypropylene. The insulation tape 160 is preferably about 5 μm-200 μm thick. If the insulation tape 160 is less than 5 μm thick, it may not have enough strength to prevent the separator from contracting. If it is more than 200 μm thick, the thickness of the jelly roll may increase.

FIG. 7 is a top view of a wound electrode assembly according to another exemplary embodiment of the present invention.

As shown in FIG. 7, in the electrode assembly 100a, the insulation tape 160a may be attached not only to the separator 150a in a position corresponding to the second electrode uncoated portion 133 of the second electrode plate 130 of the inner peripheral part, but also to the separator 150a in a position facing the first electrode plate 140 of the outer peripheral part. In particular, the insulation tape 160a may be attached to a surface of the separator 150a that does not contact the first electrode plate 140 that is positioned on the outer peripheral part of the electrode assembly 100a.

The insulation tape 160a may be attached to a surface of at least one separator 150a in a position corresponding to the first electrode uncoated portion 143 or an end of the first electrode coated portion 144 of the first electrode plate 140 positioned on the outer peripheral part of the electrode assembly 100a. Since a pair of separators 150a are interposed between both surfaces of the first electrode plate 140 and are then wound, the insulation tape 160a is attached to a surface of each separator 150a. The insulation tape 160a is preferably attached to a surface of the separator 150 that does not contact the second electrode uncoated portion 133 of the second electrode plate 130. When the insulation tape 160a is attached to the separator 150a in a position corresponding to an end of the first electrode coated portion 144 of the first electrode plate 140, the insulation plate 160a prevents the separator 150a from being damaged by a protrusion on the end of the first electrode coated portion 144.

The electrode assembly 100a generally has a second electrode tab 136 that is formed on its outer periphery. Heat that is generated at this tab is dispersed toward the exterior of the can 10. As a result, less heat from the outer peripheral part of the electrode assembly 100a enters the electrode assembly 100a than does the heat from the inner peripheral part. When heat is abruptly generated in the rechargeable battery, the separator 150a may also contract in the outer peripheral part. Accordingly, the insulation tape 160a is attached to the separator 150a in a position corresponding to the first electrode uncoated portion 143 of the first electrode plate 140 to prevent the separator 150a from contracting. The insulation tape 160a that is attached to the separator 150a on the outer peripheral part of the electrode assembly 100a may be thinner than the insulation tape 160 that is attached to the separator 150a on the inner peripheral part thereof.

The insulation tape 160a may be attached to a surface of at least one separator in a position corresponding to the first electrode uncoated portion 143 of the first electrode plate 140 that is positioned on the outer peripheral part of the electrode assembly 100a. Specifically, the first electrode uncoated portion 143 of the first electrode plate 140 is generally positioned corresponding to the second electrode tab 136 that is positioned on the outer peripheral part of the electrode assembly 100.

Accordingly, the insulation tape 160a may preferably be attached to the separator 150a in a position corresponding to an end of the first electrode uncoated portion 143 of the first electrode plate 140 that is positioned on the outer peripheral part of the electrode assembly 100a. When the separator 150a contracts due to exposure to heat, its end contracts first. The end of the first electrode uncoated portion 143 of the first electrode plate 140 is then exposed and may be short-circuited to the second electrode plate 130. Therefore, the insulation tape 160a is preferably attached to the separator 150a in a position corresponding to an end of the first electrode uncoated portion 143 of the first electrode plate 140. More preferably, the insulation tape 160a may be attached to the separator 150a so that the end of the first electrode uncoated portion 143 of the first electrode plate 140 is positioned at the center of the width of the insulation tape 160a.

The insulation tape 160a may be attached to at least one separator 150a so that the separators 150a contact each other outside the end of the first electrode plate 140 that is positioned on the outer peripheral part of the electrode assembly 100a. If the separator 150a elongates well beyond the first electrode uncoated portion 143 of the first electrode plate 140, the insulation tape 160a may be attached to an end of the separator 150a. In this case, the insulation tape 160a is attached to an end of the separator 150a outside the end of the first electrode plate 140 and prevents the end of the separator 150a from contracting.

FIG. 8 is a top view of a wound electrode assembly according to another exemplary embodiment of the present invention.

As shown in FIG. 8, in the electrode assembly 10b, the second electrode tab 136b and first electrode tab 146b are formed on the inner peripheral part of the electrode assembly 100b. The insulation tape 160 is formed on at least one surface of the separator 160b corresponding to the second electrode uncoated portion 133b of the second electrode plate 130b. The insulation tape 160 is preferably attached to a surface of the separator 150b that does not contact the second electrode uncoated portion 133b of the second electrode plate 130b.

Accordingly, the separator 150b is held in place by the insulation tape 160 and does not contract even when heat is generated. Furthermore, this configuration prevents the second electrode plate 130b and first electrode plate 140b from short-circuiting each other. The first electrode plate 140b and second electrode plate 130b and the insulation tape 160 of the electrode assembly 100b may have the same shape as shown in FIG. 5 or FIG. 6 and detailed description thereof will be omitted.

Although the present invention has been described with reference to a preferred embodiment of a can-type rechargeable battery that has an electrode assembly that is formed in a jelly roll and is uniformly compressed, the present invention is not limited to rectangular box-shaped rechargeable batteries. The electrode assembly of the present invention can be applied to any kind of battery that may use a jelly roll electrode assembly. Therefore, the present invention can be applied to cylinder-type rechargeable batteries, button-type rechargeable batteries, and primary batteries, in addition to square-type rechargeable batteries, for example.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electrode assembly, comprising:
    a first electrode plate comprising a first electrode collector, a first electrode coated portion, a first electrode uncoated portion formed on at least one side of the first electrode plate, and a first electrode tab formed on the first electrode uncoated portion of a first side of the first electrode plate;
    a second electrode plate comprising a second electrode collector, a second electrode coated portion, a second electrode uncoated portion formed on at least one side of the second electrode plate, and a second electrode tab formed on the second electrode uncoated portion of a first side of the second electrode plate; and
    a first separator for insulating the first electrode plate and second electrode plate from each other; and
    an insulation tape that is attached to the first separator;
    wherein the first separator is wound with the first electrode plate and second electrode plate to insulate them from each other,
    wherein the insulation tape overlaps at least one of the first electrode tab and the second electrode tab,
    wherein a second side of the first electrode plate is opposite the first side of the first electrode plate,
    wherein a second side of the second electrode plate is opposite the first side of the second electrode plate,
    wherein the insulating tape is coupled to a surface of the first separator facing at least one of the second side of the first electrode plate and the second side of the second electrode plate, and
    wherein the insulation tape is attached to at least an end of the separator corresponding to the position of the first electrode tab or the second electrode tab to at least an end of the separator to prevent the separator from contracting.

2. The electrode assembly of claim 1,
    wherein the insulation tape is coupled to the first separator in a position facing the first electrode plate uncoated portion or the second electrode plate uncoated portion when the first electrode plate and second electrode plate and the first separator are wound.

3. The electrode assembly of claim 2,
    wherein the insulation tape is coupled to a surface of at least one separator in a position corresponding to the first electrode uncoated portion including an end of the first electrode coated portion of the first electrode plate positioned on the outer peripheral part of the electrode assembly.

4. The electrode assembly of claim 2,
    wherein the insulation tape is coupled to a surface of at least one separator in a position corresponding to a region of the first electrode uncoated portion of the first electrode plate positioned on the outer peripheral part of the electrode assembly.

5. The electrode assembly as claimed in claim 2, further comprising a second separator,
    wherein the insulation tape is coupled to at least one of the first separator and the second separator in a position corresponding to an end of the first electrode uncoated portion of the first electrode plate positioned on the outer peripheral part of the electrode assembly.

6. The electrode assembly of claim 2,
    wherein the insulation is coupled to the separator so that an end of the first electrode uncoated portion of the first electrode plate is positioned at the center of the width of the insulation tape.

7. The electrode assembly of claim 2,
    wherein the insulation tape is coupled to at least one separator in a region wherein separators contact each other outside an end of the first electrode plate.

8. The electrode assembly of claim 2,
    wherein the insulation tape is coupled to a surface of at least one separator in a position corresponding to the second electrode uncoated portion including an end of the second electrode coated portion of the second electrode plate that is positioned on the inner peripheral part of the electrode assembly.

9. The electrode assembly of claim 3,
    wherein the insulation tape is coupled to a surface of at least one separator in a position corresponding to a region of the second electrode uncoated portion that is positioned on the inner peripheral part of the electrode assembly.

10. The electrode assembly of claim 2, further comprising a second separator,
    wherein the insulation tape is coupled to least one of the first separator and the second separator in a position corresponding to an end of the second electrode uncoated portion of the second electrode plate positioned on the inner peripheral part of the electrode assembly.

11. The electrode assembly of claim 2,
    wherein the insulation is coupled to the separator so that an end of the second electrode uncoated portion of the second electrode plate is positioned at the center of the width of the insulation tape.

12. The electrode assembly of claim 2,
    wherein the insulation tape is coupled to at least one separator in a region wherein separators contact each other outside an end of the second electrode plate that is positioned on the inner peripheral part of the electrode assembly.

13. The electrode assembly of claim 2,
    wherein the insulation tape is coupled to a surface of the separator that does not contact the second electrode plate when the insulation plate is positioned on the inner peripheral part of the electrode assembly, and wherein the insulation tape is coupled to a surface of the separator that does not contact the first electrode plate when the insulation plate is positioned on the outer peripheral part of the electrode assembly.

14. The electrode assembly of claim 1, wherein the insulation tape has a width and a height that is equal to or greater than the height of the second electrode plate.

15. The electrode assembly of claim 1, wherein the insulation tape comprises a material selected from the group consisting of polyphenylene sulfide, polyimide, and polypropylene.

16. The electrode assembly of claim 1, wherein the insulation tape is about 5 μm-200 μm thick.

17. The electrode assembly of claim 2, wherein the insulation tape that is coupled to the second separator on the outer peripheral part of the electrode assembly is thinner than the insulation tape that is attached to the first separator on the inner peripheral part of the electrode assembly.

18. The electrode assembly of claim 1, wherein the first electrode plate and the second electrode plate are formed as the negative electrode plate and the positive electrode plate, respectively.

19. The electrode assembly of claim 1, wherein the first electrode tab and the second electrode tab are positioned on the inner peripheral parts and outer peripheral parts of the electrode assembly, respectively.

20. The electrode assembly of claim 1, wherein a first electrode tab and a second electrode tab are spaced at a predetermined distance from the inner peripheral part of the electrode assembly.

21. A battery comprising the electrode assembly of claim 1.

22. A battery comprising the electrode assembly of claim 2.

23. A battery comprising the electrode assembly of claim 1, wherein the first electrode plate and second electrode plate are formed as the negative electrode plate and positive electrode plate, respectively.

* * * * *